Patented Sept. 4, 1928.

1,683,539

UNITED STATES PATENT OFFICE.

ALFRED HUGH GALLAGHER, OF CHICAGO, ILLINOIS.

STABILIZER AND PLASTER COMPOSITION CONTAINING THE SAME.

No Drawing.  Application filed September 19, 1927. Serial No. 220,640.

This invention relates to control of the time of set of gypsum plaster, and more particularly relates to the elimination of the effect of variations in plasters and in job conditions on the time of set.

Broadly, the present invention comprises the addition to gypsum plaster of an amount of a compound promoting crystallization of the plaster sufficient to dominate any amount of such influence encountered in practice with the corresponding addition of a retarder whereby the effect of variations in plaster or job conditions is suppressed by the combined effect of the added crystal forming compound and retarder. The invention thus makes it possible to fix predetermined minimum and maximum time limits within which gypsum plaster will set irrespective of job conditions or of variations in the plaster. While the invention is not predicated upon any theory of operation, it seems that the improved results are secured because the proportionate effect of variations in plaster or job conditions is made negligibly small by the addition of suitable amounts of the crystal forming compound and the retarder, the effects of which are pre-determined in extent. In practice, however, the invention makes it possible to inoculate gypsum plaster against job troubles and provides a plaster so controlled that the time of set can be fixed for all jobs whether the conditions are ideal or very bad.

Gypsum plaster is a partially hydrated calcium sulfate, corresponding approximately to the hemihydrate, $2CaSO_4.H_2O$, which on the addition of water sets with slight expansion to a hard mass. This plaster is usually prepared by calcining or burning gypsum, $CaSO_4.2H_2O$, in a kiln or kettle under closely regulated temperature conditions, the character of the plaster prepared from any given raw material depending principally upon the calcining or burning operation and the temperature to which the plaster is subjected during this operation. At a temperature of about 285° F. a break occurs in the liberation of water from the gypsum and plaster finished at this temperature is known as first-settled plaster; at a temperature of about 350° F. a second break occurs and plaster finished at this higher temperature is known as second-settled plaster. Second-settled plaster is usually not as uniform as first-settled plaster, parts being underburned and parts overburned. The character of gypsum plaster is also dependent upon the nature of the gypsum or plaster stone from which the plaster is derived, small amounts of extraneous matter in the stone subjected to burning or calcination frequently having very great effect upon the properties of the finished plaster.

The gypsum plaster alone sets very rapidly when mixed with water and would be difficult to apply. In order to regulate the time of set it has been customary to add some retarder to prolong the period of hardening. One of the ordinary commercial retarders consists of a gluelike composition derived by dissolving with lime and soda waste animal matter such as hair, hoofs, horns, hide scraps and glue tankage.

Variations in the conditions surrounding the production and use of gypsum plaster are all reflected in variations in the time of set of the plaster, that is the period between mixing the calcined plaster with water and the time when the plaster sets to a hard mass, and accompanying variation in the quality of the job. One of the factors influencing the time of set of the finished plaster is the nature of the raw material applied to the burning operation, for example, the irregular inclusion of anhydrite in the raw gypsum results in a plaster of inferior properties and patches which are irregular as to the time of set. Another factor modifying the time of set of the plaster is the calcining or burning operation. The temperature to which the plaster is subjected during calcination is extremely critical, slight variations resulting in wide variation in the time of set, underburned plaster setting with increased rapidity and overburned plaster setting more slowly. The care with which the calcining operation is carried out also frequently affects the time of set of the product, for example, if the burning is carried out in a batch operation in a kettle with a bottom discharge opening in a receptacle from which the calcined plaster is removed, a slight leakage of uncalcined or incompletely calcined plaster through the discharge during the period of calcination will materially alter the quality of the product. A further factor influencing the time of set is the job conditions under which the plaster is employed, a factor subject to extreme variation. Quality of sand and the amount of sand modify the time of set. Where the mortar box is not kept clean, the introduction of varying amounts of extraneous matter or set plaster from a previous mix prevent the attainment of a uniform time of set. The condition and nature of the lath or other surface to which the plaster is applied also modify the setting time. Weather conditions introduce another important and very variable factor.

Variation in the time of set of gypsum plaster resulting from variation in factors such as those outlined above is extremely objectionable but has been hitherto uncontrollable. Plaster which sets too quickly is difficult to work and to apply and is usually rough and non-uniform, while plaster which sets too slowly is soft, chalky, and very weak and may never set completely. Batches of plaster frequently must be completely discarded when, after mixing, the batch unexpectedly sets too rapidly owing to it being under retarded for the conditions encountered on the job, and other batches will dry out and remain soft owing to the fact that the plaster is retarded so far with respect to the conditions encountered, that the water present evaporates before crystallization is complete. One of the objects of this invention is to overcome or minimize variation in the time of set of gypsum plaster and to afford control of the time of set to eliminate the objectionable incidents of such variation.

This invention is based upon the discovery that the time of set of gypsum plaster can be controlled and the variation in the time of set hitherto met with largely eliminated or materially reduced by the addition to the calcined plaster of regulated amounts of crystal forming calcium sulphate and a suitable retarding compound. The addition of these materials, compounded or each separately to calcined plaster minimizes the effect of variations in the character of calcined plaster and provides, by regulation of the amounts of these additions for control of the varying properties of different plasters and also enables the production of a plaster that is practically independent of job conditions with respect to time of set. Calcium plaster containing crystal forming calcium sulphate and a suitable retarding compound in appropriate amounts will set within predetermined time limits irrespective of any normal variation in water, sand, mortar-box, weather, surface, workman or other job conditions.

The present invention is directed particularly to an improved stabilizing composition and to a stabilized gypsum plaster containing stabilizing components in appropriate amounts. The crystal forming calcium sulphate and the retarder may be added to the calcined plaster separately or together or they may be mixed or prepared in admixture and this mixture added to the calcined plaster. The plaster mixture should be thorough and the crystal forming calcium sulphate and the retarder should be distributed through the plaster as uniformly and as intimately as possible. Usually it is advantageous to carry out the mixing at the calcining mill or mixing plant. The amount of the stabilizing compound may be varied to control the time limits within which the plaster will set and may also be varied with plasters of differing properties to the same end.

The improved stabilizing compound of the present invention consists essentially of a crystal-forming calcium sulphate and a retarder, but may also include other ingredients, such as inert dispersing agents. This stabilizing compound is advantageously prepared by hydrolyzing waste animal matter, as mentioned above, with an alkaline agent and combining crystal-forming calcium sulphate with the products of the hydrolysis, drying and pulverizing the resulting mixture. The hydrolysis may be carried out, for example, with caustic soda, caustic potash, or lime and soda-ash. The hydrolysis is with advantage carried to an extent such that the hydrolyzed products are substantially free from insoluble materials. Reground set plaster is a particularly advantageous form of crystal-forming calcium sulphate; anhydrate and raw gypsum do not exhibit the properties of reground set plaster in the composition of the invention. The dried mixture should be pulverized, for example, to 100 mesh or 200 mesh, or better even finer. The finer the state of division of the stabilizing compound the more effective and more uniform its action.

One particularly advantageous method of preparing a stabilizing compound embodying the invention is illustrated in the following example; 800 pounds of waste animal hair, substantially free from inorganic matter, is hydrolyzed with 80 pounds of caustic soda and sufficient water to bring the volume of the composite liquor to something less than 260 gallons at a temperature corresponding to 150 pounds steam pressure for a period of one hour. Following the hydrolysis, sufficient water is added to the liquor to bring the volume to 260 gallons, so that a uniform amount of liquor will be produced from a definite number of pounds of animal matter. 1200 pounds of fresh lime, clay or other suitable inert filler is then added to the liquor, and after this filler is thoroughly distributed 2000 pounds of crystal-forming calcium sulphate is intimately incorporated into the previous mixture. The resulting pasty mixture is dried and then pulverized to 350 mesh. This product is a particularly advantageous form of the stabilizing composition of the invention and in practice has been found to be ideal for practical purposes.

The hydrolysis is advantageously carried out in an inclosed hydrolyzer under pressure. Incorporation of the filler and crystal-forming calcium sulphate in the liquor from the hydrolysis can be carried out in any of the usual types of mixing apparatus. The temperature at which the drying operation is carried out is with advantage decreased as dryness is approached, it being advantageous to conclude the drying in a steam dryer. Air separation is a convenient means of obtaining a product uniform as to fineness. From 10 to 20 pounds per ton, for example, of this stabilizing compound may be added to each ton of calcium plaster to produce a stabilized plaster embodying the present invention.

It will be understood that the amount of crystal forming calcium sulphate and the amount of retarder or the mixture containing these two, may be varied to control the time limits within which the plaster will set and may also be varied with plasters of different properties to the same end. It is usually advantageous to use increased amounts of the stabilizing components with twice settled plaster as compared to first settled plaster.

Apparently the retarder acts to prevent the gypsum plaster from setting too quickly and effectively restrains the plaster from setting in less than a fixed minimum time which is substantially independent of the job conditions or of variations in the character of the plaster, and the crystal forming calcium sulphate counteracts the influence of retarding substances or conditions and so prevents the gypsum plaster from setting too slowly and fixes a maximum time within which the plaster will set which is substantially independent of job conditions or of variations in the character of the plaster, the retarder and the crystal forming calcium sulphate thus having a combined effect other than neutralization of each other. As noted above, however, the invention is not predicated upon this or any other explanation of the phenomena occurring but upon actual observation of the results obtained in practice.

For example, the following comparative tests were carried out with the same plaster and the same sands, in the first case using a retarder prepared as described in the example above but without the addition of the crystal forming calcium sulphate and in the second case using a stabilizing compound prepared exactly as described in the example above. A mixture of 4 ounces of plaster, 2½ grains of retarder and 65 c. c. of water set on glass in 900 minutes; the same composition with 8 ounces of Detroit sand added set on glass in 285 minutes; the same composition with 8 ounces of Miami sand added set on glass in 45 minutes; and the same composition with 8 ounces of Norfolk sand added set on glass in 427 minutes. A mixture of 4 ounces of plaster, 15 grains of the stabilizing compound and 65 c. c. of water set on glass in 295 minutes; the same composition with 8 ounces of Detroit sand added set on glass in 305 minutes; the same composition with 8 ounces of Miami sand added set on glass in 250 minutes, and the same composition with 8 ounces of Norfolk sand added set on glass in 350 minutes.

The use of the stabilized plaster in the present invention also promotes the uniformity and the quality of the finished job. The plaster will not stay soft too long in damp weather delaying succeeding operations, nor will it set too rapidly applied to dry lath or in dry weather making proper application difficult. Changes in water or in sand, that frequently go unnoticed do not materially effect the time of set. All of the variations in job conditions are largely overcome or materially reduced and the attainment of uniformity and uniform high quality is much facilitated.

It will thus be seen that this invention provides for the control of the time of set of gypsum plaster, for the control of the time of set substantially independently of normal varitions in job conditions, and practically overcomes difficulties that have hitherto been considered inherent in the use of gypsum plaster. This invention enables the plaster manufacturer to control his product and variations therein and to produce a uniform product. This invention also enables the plasterer to work with assurance that the job will not be subject to variations in quality due to unexpected and uncontrollable causes and provides a plaster which is easily applied without being subject to variations which prevent uniform working thus promoting good workmanship.

While the invention has been described in considerable detail, particularly with respect to certain embodiments of the invention, it will be understood that the invention is not limited to the specific proportions and materials described by way of illustration herein but that the scope of the invention is defined in the appended claims in which I have endeavored to distinguish the invention from the prior art so far as known to me without, however, relinquishing or abandoning any portion or feature thereof.

I claim:

1. A stabilized plaster composition comprising gypsum plaster, nitrogenous organic retarding material of such effective strength as to inhibit the setting of the plaster for a predetermined period of time, and crystal-forming calcium sulfate accelerating material of such effective strength as to effect setting of the plaster in a period of time not greatly exceeding that predetermined.

2. A stabilized plaster composition comprising gypsum plaster, hydrolyzed keratin retarding material substantially free from insoluble material of such effective strength as to inhibit the setting of the plaster for a predetermined period of time, and crystal-forming calcium sulfate accelerating material in amount sufficient to effect setting of the plaster in a period of time not greatly exceeding that predetermined.

3. A stabilized plaster composition comprising plaster crystal-forming calcium sulfate accelerating material of such effective strength as to overcome normal retarding influences of the composition resulting from job conditions, and nitrogenous organic retarding material of such effective strength as to overcome the normal accelerating influences of the composition resulting from job conditions, said nitrogenous organic retarding material and said crystal-forming calcium sulfate accelerating material having no substantial neutralizing effect upon one another so that the time of setting of the composition will be uniform and will not be materially affected by job conditions.

4. A composition for use as a stabilizer for gypsum plaster comprising a mixture of nitrogenous organic retarding material of such effective strength as to inhibit the setting of plaster for a predetermined period of time, and crystal-forming calcium sulfate accelerating material of such effective strength as to effect setting of plaster in a period of time not greatly exceeding that predetermined.

5. A composition for use as a stabilizer for gypsum plaster comprising a mixture of hydrolyzed keratin retarding material substantially free from insoluble material and of such effective strength as to inhibit setting of plaster for a predetermined period of time, and crystal-forming calcium sulfate accelerating material in amount sufficient to effect setting of plaster in a period of time not greatly exceeding that resulting from the effect of the retarding material.

In testimony whereof I affix my signature.

ALFRED HUGH GALLAGHER.

---

CERTIFICATE OF CORRECTION.

Patent No. 1,683,539.      Granted September 4, 1928, to

ALFRED HUGH GALLAGHER.

It is hereby certified that error appears in the printed specification of the above numbered patent requiring correction as follows: Page 1, line 10, for the word "influence" read "influences"; same page, line 87, for the word "patches" read "batches"; and that the said Letters Patent should be read with these corrections therein that the same may conform to the record of the case in the Patent Office.

Signed and sealed this 23rd day of October, A. D. 1928.

M. J. Moore,
Acting Commissioner of Patents.

(Seal)

terial of such effective strength as to effect setting of the plaster in a period of time not greatly exceeding that predetermined.

2. A stabilized plaster composition comprising gypsum plaster, hydrolyzed keratin retarding material substantially free from insoluble material of such effective strength as to inhibit the setting of the plaster for a predetermined period of time, and crystal-forming calcium sulfate accelerating material in amount sufficient to effect setting of the plaster in a period of time not greatly exceeding that predetermined.

3. A stabilized plaster composition comprising plaster crystal-forming calcium sulfate accelerating material of such effective strength as to overcome normal retarding influences of the composition resulting from job conditions, and nitrogenous organic retarding material of such effective strength as to overcome the normal accelerating influences of the composition resulting from job conditions, said nitrogenous organic retarding material and said crystal-forming calcium sulfate accelerating material having no substantial neutralizing effect upon one another so that the time of setting of the composition will be uniform and will not be materially affected by job conditions.

4. A composition for use as a stabilizer for gypsum plaster comprising a mixture of nitrogenous organic retarding material of such effective strength as to inhibit the setting of plaster for a predetermined period of time, and crystal-forming calcium sulfate accelerating material of such effective strength as to effect setting of plaster in a period of time not greatly exceeding that predetermined.

5. A composition for use as a stabilizer for gypsum plaster comprising a mixture of hydrolyzed keratin retarding material substantially free from insoluble material and of such effective strength as to inhibit setting of plaster for a predetermined period of time, and crystal-forming calcium sulfate accelerating material in amount sufficient to effect setting of plaster in a period of time not greatly exceeding that resulting from the effect of the retarding material.

In testimony whereof I affix my signature.

ALFRED HUGH GALLAGHER.

CERTIFICATE OF CORRECTION.

Patent No. 1,683,539.      Granted September 4, 1928, to

ALFRED HUGH GALLAGHER.

It is hereby certified that error appears in the printed specification of the above numbered patent requiring correction as follows: Page 1, line 10, for the word "influence" read "influences"; same page, line 87, for the word "patches" read "batches"; and that the said Letters Patent should be read with these corrections therein that the same may conform to the record of the case in the Patent Office.

Signed and sealed this 23rd day of October, A. D. 1928.

(Seal)

M. J. Moore,
Acting Commissioner of Patents.